(12) United States Patent
Liu et al.

(10) Patent No.: US 11,455,907 B2
(45) Date of Patent: Sep. 27, 2022

(54) ADAPTIVE VOCABULARY IMPROVEMENT

(71) Applicant: INTERNATIONAL BUSINESS MACHINES CORPORATION, Armonk, NY (US)

(72) Inventors: Su Liu, Austin, TX (US); Manjunath Ravi, Austin, TX (US); Zhichao Li, Austin, TX (US); Kai Liu, Malden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 483 days.

(21) Appl. No.: 16/200,707

(22) Filed: Nov. 27, 2018

(65) Prior Publication Data

US 2020/0168116 A1    May 28, 2020

(51) Int. Cl.
*G09B 5/02*     (2006.01)
*G09B 19/00*     (2006.01)

(52) U.S. Cl.
CPC .............. *G09B 19/00* (2013.01); *G09B 5/02* (2013.01)

(58) Field of Classification Search
USPC ......................................................... 434/169
See application file for complete search history.

(56) References Cited

U.S. PATENT DOCUMENTS

| | | | |
|---|---|---|---|
| 5,256,067 A | 10/1993 | Gildea et al. | |
| 6,120,297 A | 9/2000 | Morse, III et al. | |
| 6,343,935 B1 | 2/2002 | Clements | |
| 6,430,551 B1 | 8/2002 | Thelen et al. | |
| 8,078,465 B2 | 12/2011 | Paul et al. | |
| 8,532,994 B2 | 9/2013 | Malegaonkar et al. | |
| 8,708,702 B2 | 4/2014 | Paul | |
| 8,744,855 B1 * | 6/2014 | Rausch ................... | G09B 17/00 704/270 |
| 8,903,716 B2 | 12/2014 | Chen et al. | |
| 8,990,083 B1 | 3/2015 | Gannu et al. | |
| 2004/0186712 A1 | 9/2004 | Coles et al. | |
| 2007/0112554 A1 | 5/2007 | Goradia | |

(Continued)

OTHER PUBLICATIONS

IBM, "Social computing based personal vocabulary building.", IP.com, IPCOM000173550D, Aug. 13, 2008, 6 pages.

(Continued)

*Primary Examiner* — Thomas J Hong
(74) *Attorney, Agent, or Firm* — Edward Wixted; Andrew D. Wright; Roberts Calderon Safran & Cole, P.C.

(57) ABSTRACT

A computer-implemented method includes recognizing, by a computer device, a word as a new learned word for a user; registering, by the computer device, the new leaned word in a user's new learned word list as a registered new learned word; associating, by the computer device, the registered new learned word with related known words in a user's known word library, the known word library including words known to the user; tracking, by the computer device, uses of the related known words by the user; identifying, by the computer device, a used sentence used by the user that contains one of the related known words; and suggesting, by the computer device, to the user a new sentence that replaces the one of the related known words in the used sentence with the new learned word.

17 Claims, 9 Drawing Sheets

(56) References Cited

U.S. PATENT DOCUMENTS

| | | | |
|---|---|---|---|
| 2007/0172805 A1* | 7/2007 | Paul | G09B 5/00 434/308 |
| 2007/0269775 A1* | 11/2007 | Andreev | G09B 7/00 434/156 |
| 2008/0059145 A1* | 3/2008 | Wood | G09B 19/06 704/2 |
| 2008/0301096 A1* | 12/2008 | Kogan | G06F 16/36 |
| 2009/0246744 A1* | 10/2009 | Lofthus | G09B 5/02 434/169 |
| 2011/0144978 A1 | 6/2011 | Tinkler | |
| 2012/0254802 A1* | 10/2012 | Tinkler | G06F 16/3322 715/830 |
| 2013/0149681 A1* | 6/2013 | Tinkler | G09B 7/04 434/167 |
| 2013/0189654 A1* | 7/2013 | Symmes | G09B 5/06 434/169 |
| 2013/0309640 A1* | 11/2013 | Sanders | G09B 5/08 434/178 |
| 2015/0132726 A1* | 5/2015 | Hsia | G09B 19/06 434/169 |
| 2016/0027333 A1* | 1/2016 | Labutov | G06F 40/40 434/157 |
| 2017/0046970 A1 | 2/2017 | Liu et al. | |
| 2018/0025657 A1* | 1/2018 | Kim | G06K 9/6255 434/169 |
| 2019/0080627 A1* | 3/2019 | Dey | G09B 19/00 |
| 2020/0135041 A1* | 4/2020 | Arslan | G06Q 10/06398 |

OTHER PUBLICATIONS

Anonymous, "Method and System for Vocabulary Building via Observation of Speech Patterns in Real Time", IP.com, IPCOM000219815D, Jul. 17, 2012, 3 pages.

Rawal, "Handling Repeatedly Asked Word Meanings and Vocabulary Building, In Ebooks", IP.com, IPCOM000251329D, Oct. 30, 2017, 6 pages.

Landauer et al., "A New Yardstick and Tool For Personalized Vocabulary Building." Proceedings of the NAACL HLT Workshop on Innovative Use of NLP for Building Educational Applications, pp. 27-33, Stroudsburg, PA, Jun. 2009, 7 pages.

Epp et al., "Towards providing just-in-time vocabulary support for assistive and augmentative communication." Proceedings of the 2012 ACM international conference on Intelligent User Interfaces, IUI'12, ACM, New York, NY, USA, pp. 33-36, Feb. 14-17, 2012, 4 pages.

Anonymous, "Evidence-Based Reading Intervention for Struggling Readers and English Language Learners", https://www.scilearn.com/products/fast-forword, Fast ForWord by Scientific Learning, accessed Nov. 19, 2018, 3 pages.

Mell et al., "The NIST Definition of Cloud Computing", NIST, Special Publication 800-145, Sep. 2011, 7 pages.

* cited by examiner

| WORD | FREQcount | CDcount | FREQlow | CDlow | SUBTLwf | Lg10WF | SUBTLcd | LG10CD | Length of word |
|---|---|---|---|---|---|---|---|---|---|
| fault | 5310 | 3101 | 5291 | 3091 | 104.12 | 3.7252 | 36.97 | 3.4916 | 5 |
| mistake | 5200 | 3221 | 5156 | 3115 | 101.96 | 3.7161 | 37.21 | 3.4944 | 7 |
| failure | 1021 | 744 | 952 | 715 | 20.02 | 3.0095 | 8.87 | 2.8722 | 7 |
| error | 473 | 363 | 447 | 357 | 9.27 | 2.6758 | 4.33 | 2.5611 | 5 |
| breakdown | 373 | 290 | 356 | 278 | 7.31 | 2.5729 | 3.46 | 2.4639 | 9 |
| malfunction | 147 | 114 | 129 | 107 | 2.88 | 2.1703 | 1.36 | 2.0607 | 11 |
| defect | 126 | 88 | 122 | 88 | 2.47 | 2.1038 | 1.05 | 1.9494 | 6 |
| glitch | 103 | 77 | 102 | 76 | 2.02 | 2.017 | 0.92 | 1.8921 | 6 |

FIG. 6

| SAMPLE TEXT | GRADE LEVEL | READABILITY INDEX |
|---|---|---|
| breakdown sign light | 2 | 90 |
| check engine light | 5 | 63 |
| failure sign light | 5 | 63 |
| malfunction sign light | 6 | 64 |
| defect indicator lamp | 6 | 13 |
| glitch indicator lamp | 9 | 35 |
| malfunction indicator lamp | 10 | 34 |

FIG. 7

ADAPTIVE VOCABULARY IMPROVEMENT

BACKGROUND

The present invention relates generally to computer-based self-improvement systems and, more particularly, to computer-based adaptive vocabulary improvement as applied through a real-time vocabulary memorization assistant.

The number of words that exist in any particular language far exceeds the number of words known by even those who regularly speak that particular language. People who speak the particular language as their second language typically know an even smaller percentage of that language's words. Some people, for example, have the desire to learn more of the words in a particular language so that they can more intelligently converse with others.

SUMMARY

In a first aspect of the invention, there is a computer-implemented method including: recognizing, by a computer device, a word as a new learned word for a user; registering, by the computer device, the new leaned word in a user's new learned word list as a registered new learned word; associating, by the computer device, the registered new learned word with related known words in a user's known word library, the known word library including words known to the user; tracking, by the computer device, uses of the related known words by the user; identifying, by the computer device, a used sentence used by the user that contains one of the related known words; and suggesting, by the computer device, to the user a new sentence that replaces the one of the related known words in the used sentence with the new learned word.

In another aspect of the invention, there is a computer program product including a computer readable storage medium having program instructions embodied therewith. The program instructions are executable by a computing device to cause the computing device to: recognize a word as a new learned word for a user; register the new leaned word in a user's new learned word list as a registered new learned word; associate the registered new learned word with related known words in a user's known word library, the known word library including words known to the user; track uses of the related known words by the user; identify a used sentence used by the user that contains one of the related known words; and suggest to the user a new sentence that replaces the one of the related known words in the used sentence with the new learned word.

In another aspect of the invention, there is system including a processor, a computer readable memory, and a computer readable storage medium. The system includes: program instructions to recognize a word as a new learned word for a user; program instructions to register the new leaned word in a user's new learned word list as a registered new learned word; program instructions to associate the registered new learned word with related known words in a user's known word library, the known word library including words known to the user; program instructions to track uses of the related known words by the user; program instructions to identify a used sentence used by the user that contains one of the related known words; and program instructions to suggest to the user a new sentence that replaces the one of the related known words in the used sentence with the new learned word. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 6 shows a chart of word frequency used by embodiments of the invention.

FIG. 7 shows a chart showing a relationship of word frequency and readability used by embodiments of the invention.

DETAILED DESCRIPTION

Figure 1:
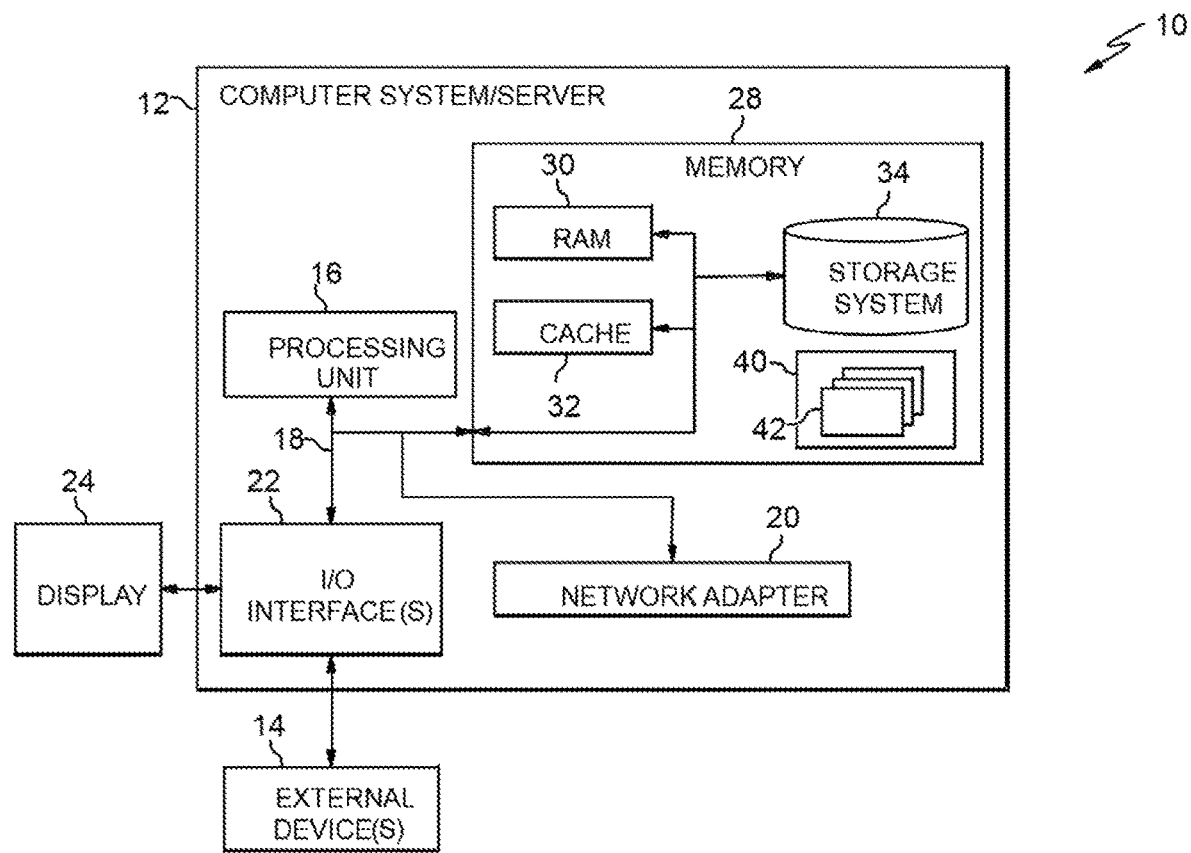
FIG. 1 depicts a cloud computing node according to an embodiment of the present invention.

The present invention relates generally to computer-based self-improvement systems and, more particularly, to computer-based adaptive vocabulary improvement. According to aspects of the invention a system: recognizes a word as a new learned word for a user; registers the new leaned word in a user's new learned word list as a registered new learned word; associates the registered new learned word with related known words in a user's know word list, the known word list including words known to the user; tracks uses of the related known words by the user; identifies a sentence used by the user that contains one of the related known words; and suggests to the user a new sentence that replaces the related known word in the used sentence with the new learned word. In embodiments, a second used sentence used by the user the contains the new learned word is identified, and new learned word data the identifying of the second used sentence as a usage of the new learned word is saved. In this manner, implementations of the invention provide a user with an automated and adaptive system to improve the vocabulary of the user.

Advantageously, embodiments of the invention provide improvements to the technical field of language learning. By tracking a user's use of words and pairing one of those words with a synonym that is a new word to the user, and then suggesting (in real-time) a new sentence using the new word, embodiments of the invention improve the user's vocabulary.

Embodiments of the invention also employ an unconventional arrangement of steps including: tracking the user's inquiries regarding a new word; comparing the new word to words known to the user; and suggesting the use of the new word multiple times over time by suggesting new sentences (in real-time) as replacements for currently spoken sentences. The steps themselves are unconventional, and the combination of the steps is also unconventional. For example, the steps of tracking the user's inquiries and comparing the new words to words known to the user create new information that does not exist in the system (new learned word data), and this new information is then used in subsequent steps in an unconventional manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
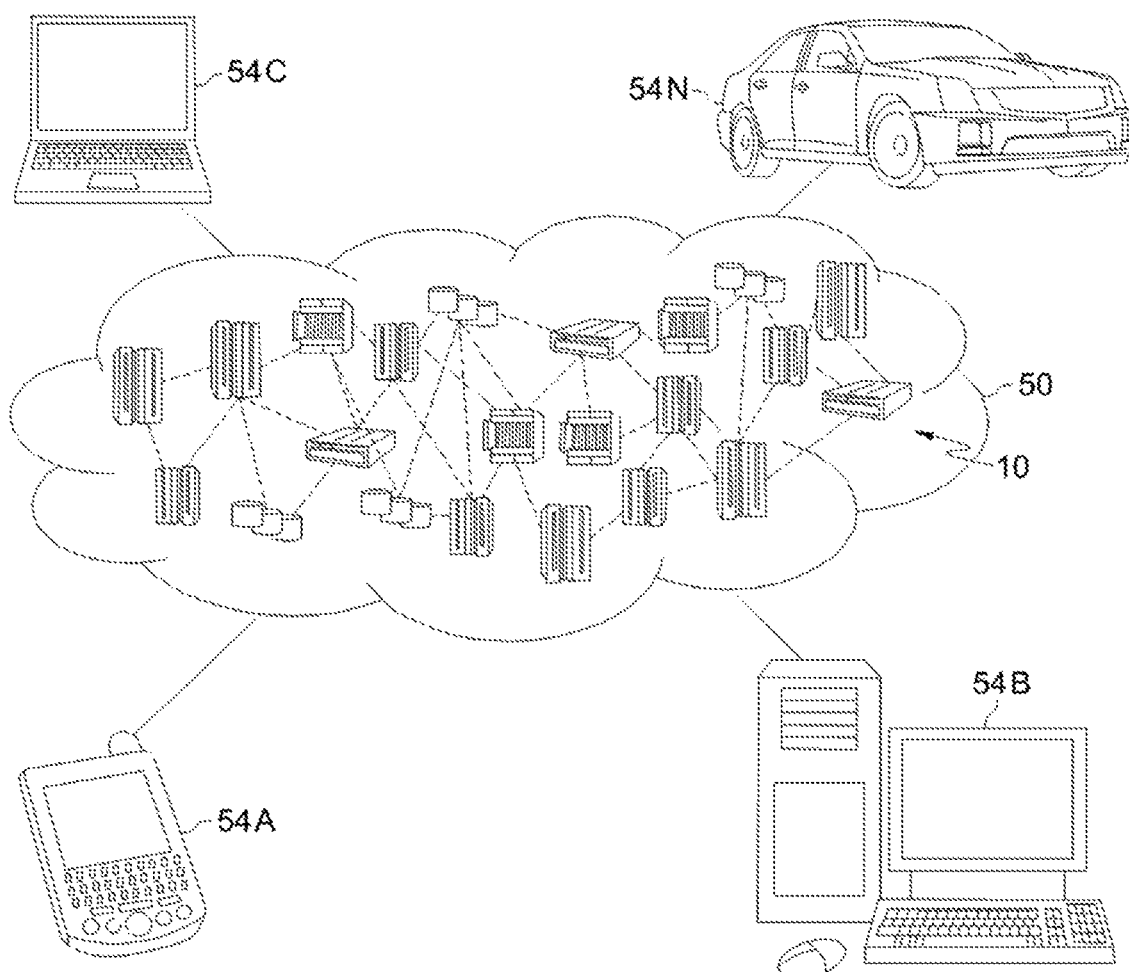
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
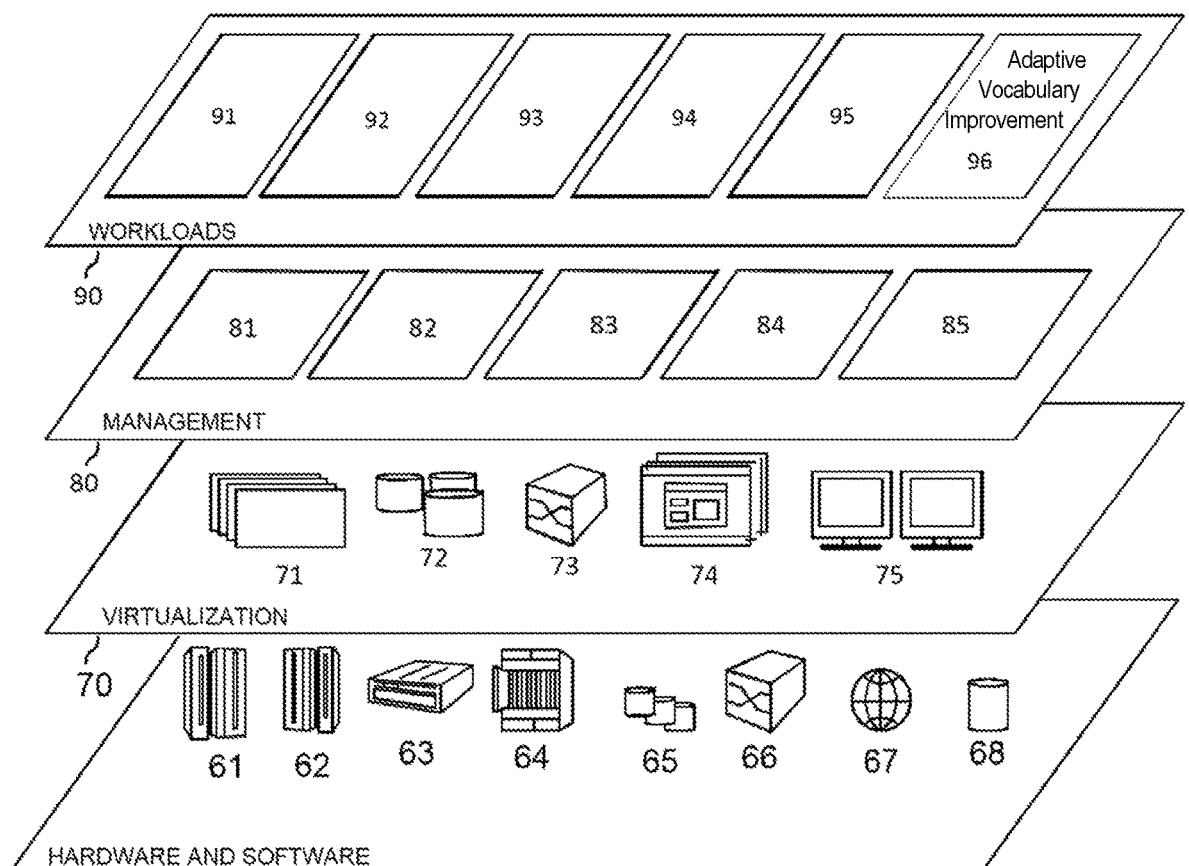
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive vocabulary improvement 96 such as a real-time vocabulary memorization assistant 200 in FIG. 4.

Implementations of the invention may include a computer system/server 12 of FIG. 1 in which one or more of the program modules 42 are configured to perform (or cause the computer system/server 12 to perform) one of more functions of the adaptive vocabulary improvement 96 of FIG. 3. For example, the one or more of the program modules 42 may be configured to: recognize a word as a new learned word for a user; register the new leaned word in a user's new learned word list as a registered new learned word; associate the registered new learned word with related known words in a user's know word list, the known word list including words known to the user; track uses of the related known words by the user; identify a used sentence used by the user that contains one of the related known words; and suggest to the user a new sentence that replaces the one of the related known words in the used sentence with the new learned word.

To the extent implementations of the invention collect, store, or employ personal information provided by, or obtained from, individuals (for example, during the tracking of words used by the user, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

There is a large demand for continuing education for adults. In particular, many adults would like to improve their vocabulary, but do not have access to an effective way to learn new vocabulary.

Statistical data indicates that 43% of the population of certain regions has low literacy. Nearly a billion people around the world speak English and most of them speak English as a second language. For most people who are not originally from the country they reside in, learning, memorizing, choosing, and using a proper word in conversation and in writing are big challenges in their daily life. Such difficulties may reduce communication quality and result in not recognizing important messages and/or information.

Many people that desire to improve their literacy cannot keep track of what they just learned and said and do not have any way to receive feedback and/or recommendations to improve their vocabulary. Even when a person tries to learn a new word, it is difficult to know when and how to use that new word in certain context. As a result, there is a need for a system that provides real-time suggestions and feedback regarding new words for people learning and/or improving their literacy.

Embodiments of the invention use or generate a mapping table of word and literacy level based on word use frequency. Studies indicate people can master a new word after using it more than 10 times. Embodiments of the invention suggest uses of a new word to prompt the user to use the word frequently as a substitute for other words that the user already knows. As an example, after learning the new word "articulate" (difficulty rank=4915, frequency=5350), a user may want to use it instead of "say" (19/1915138), "speak" (336/117358), "explain" (481/80797), and/or "express" (1279/30947) in their daily life so they can memorize "articulate" in different contexts. For example: to explain and express, "They struggled to articulate their thoughts"; to speak and pronounce, "I was too distracted to articulate properly"; to be related to something, "Those courses are deigned to articulate with university degrees".

Figure 4:
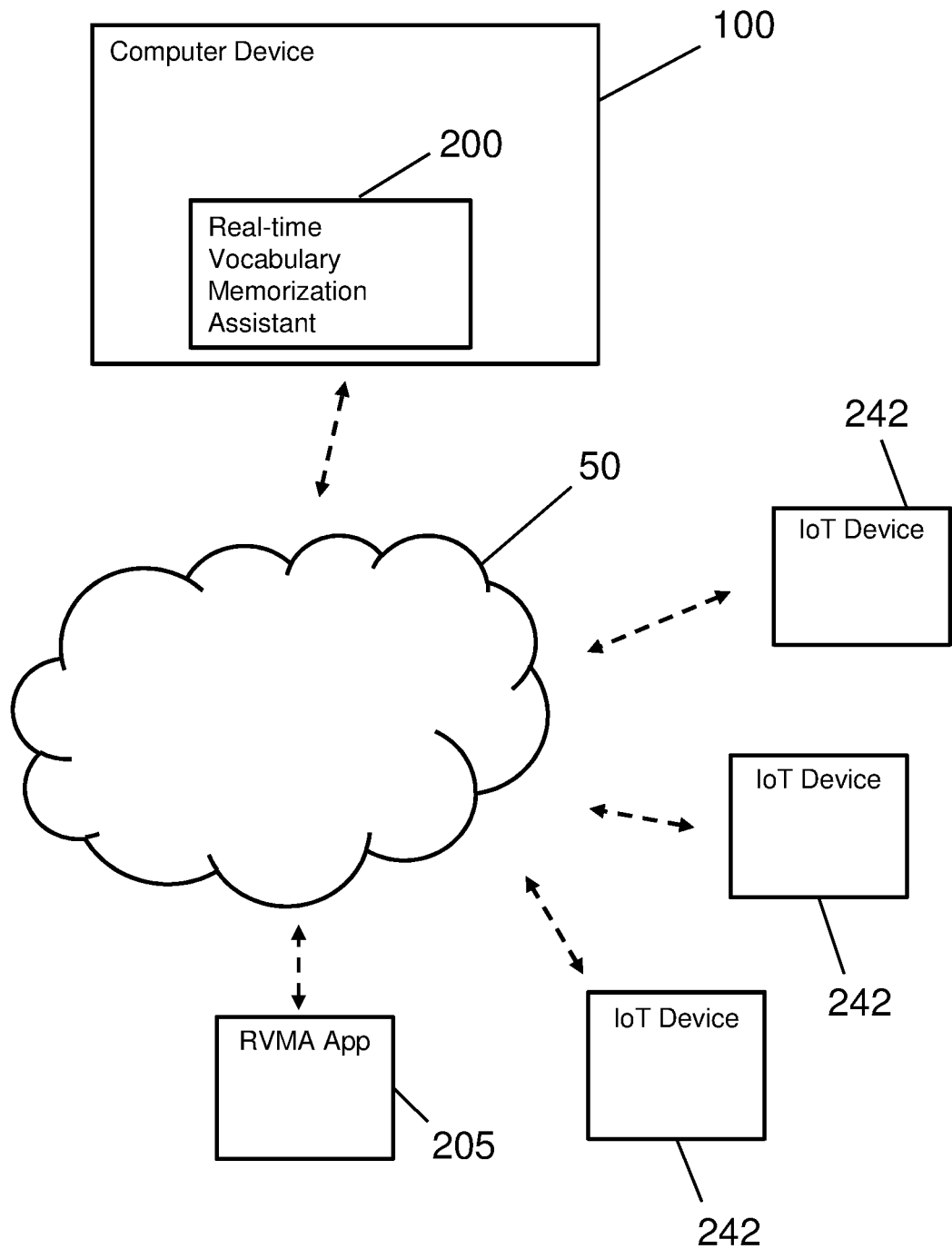
FIG. 4 shows a block diagram of an exemplary environment in accordance with aspects of the invention.

FIG. 4 shows a block diagram of an exemplary environment in accordance with aspects of the invention. In embodiments, the environment includes a computer device 100, for example, the computer system/server 12 shown in FIG. 1, that includes a real-time vocabulary memorization assistant (RVMA) 200. In embodiments, the RVMA 200 is a module 42 shown in FIG. 1. In embodiments, the RVMA 200 performs the functions of adaptive vocabulary improvement 96, including: recognize a word as a new learned word for a user; register the new leaned word in a user's new learned word list as a registered new learned word; associate the registered new learned word with related known words in a user's know word list, the known word list including words known to the user; track uses of the related known words by the user; identify a used sentence used by the user that contains one of the related known words; and suggest to the user a new sentence that replaces the one of the related known words in the used sentence with the new learned word. In the example shown in FIG. 4, the computer device 100 is one of the cloud computing nodes 10 of the cloud computing environment 50. Also shown in FIG. 4 is a plurality of Internet of Things (IoT) devices 242 that are, for example, cloud computing nodes 10 shown in FIG. 2. Examples of the IoT devices 242 are appliances, vehicles, televisions, audio devices, etc.

The example in FIG. 4 also includes an RVMA app 205 that runs on, for example, a smart phone, tablet, or other device that runs apps. In embodiments, the RVMA app 205 runs on a smart phone that is in the possession of a user of the RVMA 200. The user accesses the RVMA 200 through the RVMA app 205 such that the RVMA app 205 (through the smart phone) collects audio and/or video information that is used by the RVMA 200 to perform various steps of methods of embodiments of the invention.

Embodiments of the invention include an IoT-based real-time vocabulary memorization assistant (RVMA) for monitoring daily conversation and vocabulary usage, recommending new words based on a current literacy level, and evaluating new word usage and memorization.

An exemplary method includes: defining a framework for supporting real-time vocabulary memorization; defining a new learned word data structure to track vocabulary usage and memorization level; providing a configuration user interface for controlling and managing a real-time vocabulary memorization service; recognizing each new learned word (NLW) which is presented to a user for memorization; registering the recognized new learned word (NLW) into a new word list of the user; associating and pairing the registered NLW with the user's known words (UKWs, synonyms)(such as, articulate, say, talk, speak, explain, express, etc.); tracking conversation and related contexts from daily conversation; identifying a sentence which contains user's known words that are associated with the NLW; suggesting a new sentence to the user that replaces a UKW with the NLW; identifying a sentence used by the user which contains the NLW; evaluating NLW usage and encouraging the user; updating NLW data to reinforce and improve a pairing of the UKW and the NLW.

Figure 5:
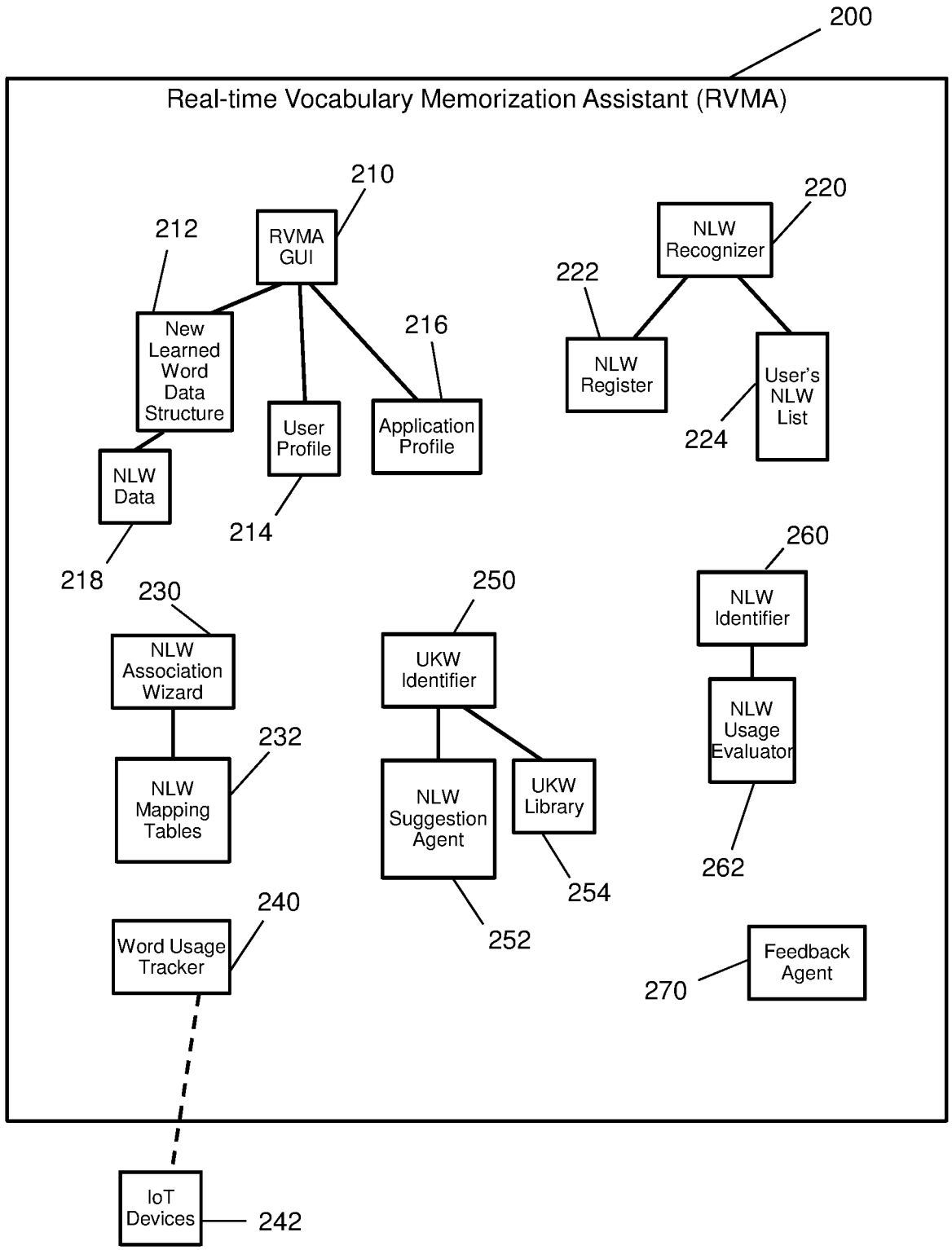
FIG. 5 shows a block diagram of an exemplary system in accordance with aspects of the invention.

FIG. 5 shows an example of an embodiment of the invention. The RVMA 200 in this example includes a number of modules (for example, the modules 42 in FIG. 1) that perform various functions.

In embodiments, the RVMA GUI 210 is a user interface that provides a configuration user interface (UI) to control and manage a real-time vocabulary memorization service. Using the RVMA GUI 210, users and service vendors manage service features and scope, customized rules, and related profiles. The RVMA GUI 210 accesses and modifies an NLW data structure 212, a user profile 214, and an application profile 216.

The NLW data structure 212 is a data structure for recording and tracking new learned word usage and memorization level. In embodiments, the NLW data structure 212 is defined as:

```
NewLearnedWord{
UserID,
NewWord,
User's-frequency(times/day),
memorization level (0~10),
lastTimetoUse... (mm/dd/yyyy),
listofUKWs (List<String>)...}
```

Where for each NLW, the following NLW data 218 is stored according to the above data structure. A UserID field contains a user ID that associates the NLW data of this particular NLW with the correct user. A NewWord field contains the NLW. A User's-frequency field contains the number of times per day (for example) that the user uses the NLW. A memorization level field indicates the level of memorization by the user of the NLW on a scale from 0-10 (for example). In embodiments, the memorization level field records the number of times the user correctly uses the NLW in a sentence after the word is designated as an NLW. A lastTimetoUse field contains the date of the final use of the NLW as an NLW. When the date in the lastTimetoUse field occurs, the NLW is deleted from the NLW list as a word that has not been used enough over a preset time period to be considered as learned. In most cases, the NLW will transfer to a UKW library 254 before the date in the lastTimetoUse field (explained in more detail herein). The listofUKWs field includes a string of UKWs that are associated with this NLW. When the user uses one of the words in the listofUKWs field, the system begins the process (described herein) of suggesting a sentence using the NLW instead of the associated UKW.

The user profile 214 is a plain text file or database that configures and saves service personalized for the particular user. For example, the user profile 214 contains the user's education background, native language and level, literacy level in the current saved language, UKW-NLW association rules, etc. The application profile 216 is a plain text file or database for configuring and saving application service rules, limitations, and/or restrictions.

In embodiments, the NLW recognizer 220 is a module that monitors the user's activity and recognizes a word as an NLW which the user should memorize. For example, when a user searches for the word "articulate" in an e-dictionary or other source, the NLW recognizer 220 recognizes the word "articulate" as an NLW. The NLW recognizer 220 accesses and modifies an NLW register 222 and a user's NLW list 224.

In embodiments, the NLW register 222 is a module that registers the recognized NLW into a user's new word list 224. The user's NLW list 224 is a list of words used by the user in a certain time period and tracks new word usage and evaluates the user's memorization level of each NLW.

In embodiments, the NLW association wizard 230 is a module that associates (pairs) the registered NLW with those UKWs that are synonyms of the NLW. For example, the identified NLW "articulate" is associated to the UKWs "say", "talk", "speak", "explain", "express", etc. The NLW association wizard 230 accesses and modifies NLW mapping tables 232.

In embodiments, NLW mapping tables 232 are a set of word mapping tables for paring UKWs and NLWs for users. The NLW mapping tables 232 take various forms and include tables such as that shown in FIG. 6. FIG. 6 shows an example of a table of use frequencies of particular related words. The table in FIG. 6 shows the use frequency of the word "fault" and words that are synonymous with "fault" based on various known frequency libraries. The table shown in FIG. 6 is just one example of the NLW mapping tables 232 shown in FIG. 5.

In embodiments, the word usage tracker 240 is a module for tracking work usage and related contexts from daily word usage (for example, dictionary searches, word processing, email, telephone conversations, presentations, in-person conversations, etc.). In embodiments, tracking operations of the word usage tracker 240 come from one or more IoT devices 242. For example, a voice activated personal assistant (IoT device 242) tracks the user's use of the words "say", "talk", "speak", "explain", and "express" and the context in which each of those words was used.

In embodiments, the UKW identifier 250 is a module that identifies a user's sentence as containing the associated user's UKWs. The UKW identifier 250 considers the context in which the UKN is used. Users select a different word when communicating with different people. The UKW identifier 250 identifies context associated with a pair of people who are involved in a given communication, and then sets a vocabulary level for that pair of people. For example, if a person of a certain vocabulary level is involved in the communication, then the UKW identifier 250 sets the vocabulary level at that certain vocabulary level. The UKW identifier 250 accesses and modifies a NLW suggestion agent 252 and a UKW library 254.

In embodiments, the NLW suggestion agent 252 is a module for suggesting a new sentence with a replaced NLW to the user in real-time, or near real-time, according to context and related factors (conversation partners, conversation types, etc.). FIG. 7 shows an example of a table of phrase level and readability of the phrase "breakdown sign light" and other phrases that are related to the phrase "breakdown sign light". The table shown in FIG. 7 is an example of a table used by the NLW suggestion agent 252 shown in FIG. 5. Tables such as that shown in FIG. 7 provide alternate ways of communicating a particular thought based on, in this example, a grade level of one of the participants in the communication.

In embodiments, the NLW identifier 260 is a module that identifies a received user's sentence as containing an NLW. The NLW identifier 260 accesses and modifies an NLW usage evaluator 262. The NLW usage evaluator 262 is a module that evaluates NLW usage, learning/memorizing progress, and daily practices, and saves the data into the NLW data structure 212. For example, an NLW is added to the listofUKWs field of the NLW data structure 212 (and associated with the other UKWs that were originally associated with the NLW) once the user has memorized it. In embodiments, the NLW is also saved to the UKW library 254 once the user has memorized it.

In embodiments, the feedback agent 270 is a module that provides feedback to the user to continuously use NLWs after detecting an NLW usage. In embodiments, the feedback comprises encouragement by giving credits (such as, for example, in a game or contest), incentives (such as, for example, discounts on other products), encouraging words, etc. In embodiments, the feedback includes an indication to the user that the use of the NLW is a desired use.

Figure 8:
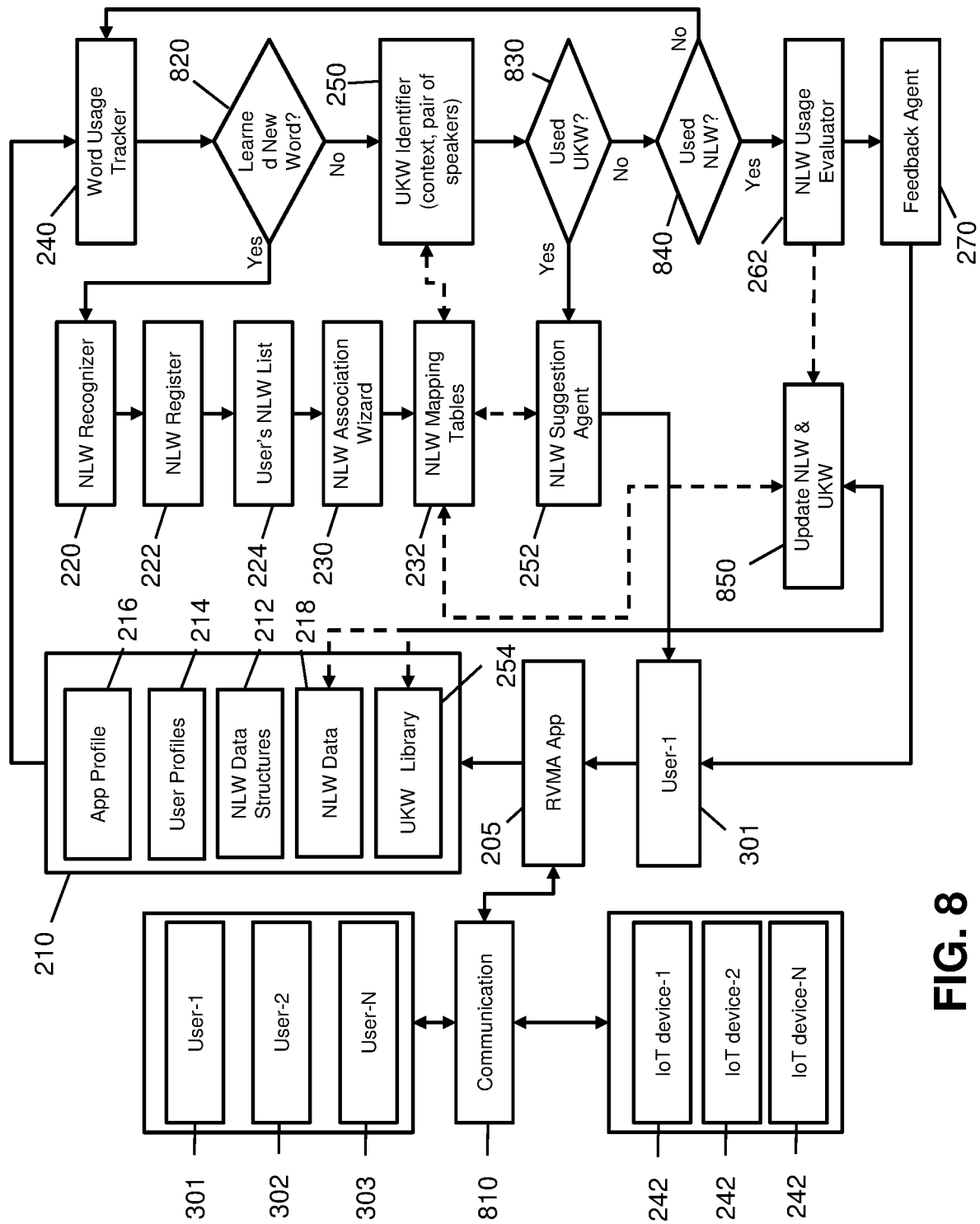
FIG. 8 shows a functional block diagram of an exemplary method in accordance with aspects of the invention.

FIG. 8 is a functional block diagram in accordance with aspects of the present invention. The block diagram is described with reference to elements depicted in FIG. 5 and illustrates elements of, and functions performed by, the RVMA 200 and the computer device 100.

At step 810, communications take place between a user 301, 302, 303 and the RVMA app 205. Examples of these communications are discussed above and include, for example, dictionary searches, word processing, email, telephone conversations, presentations, in-person conversations, etc. In embodiments, these communications take place though one or more IoT devices 242.

In implementations, the RVMA app 205 sends the communications from step 810 to the RVMA 200 that resides on the computer device 100. FIG. 8 shows processing progressing through RVMA GUI 210 and word usage tracker 240 as described above.

At step 820, if the word usage tracker 240 tracks a word that is recognized as a NLW by the NLW recognizer 220, then processing continues through the NLW register 222, the user's NLW list 224, the NLW association wizard 230, the NLW mapping tables 232, and the NLW suggestion agent 252 as described above to suggest to the user 301 a new sentence using the NLW in the place of a UKW when the user next uses that UKW in a sentence.

At step 820, if the word usage tracker 240 tracks a word that is recognized as a UKW, then the UKW identifier 250 identifies the context of the usage of the UKW. Processing then continues to step 830 where the UKW identifier 250 determines if a UKW has been used. If at step 830 the UKW identifier 250 determines that a UKW has been used, then the NLW suggestion agent 252 (by consulting the NLW mapping tables 232) suggests to the user 301 a new sentence using one of the NLWs (in the user's NLW list 224) in the place of a UKW when the user next uses that UKW in a sentence. If at step 830 the UKW identifier 250 determines that a UKW has not been used, then, at step 840, the NLW identifier 260 determines is an NLW has been used by the user 301.

If, at step 840, an NLW has not been used, then processing returns to the word usage tracker 240 to track another word used by the user 301. If, at step 840, an NLW has been used by the user 301, then the NLW usage evaluator 262 updates (at step 850) the user's NLW list 224 and the UKW library 254. After the NLW usage evaluator 262 determines that the user 301 has used the NLW, the feedback agent 270 provides feedback to the user 301 as described above.

Figure 9:
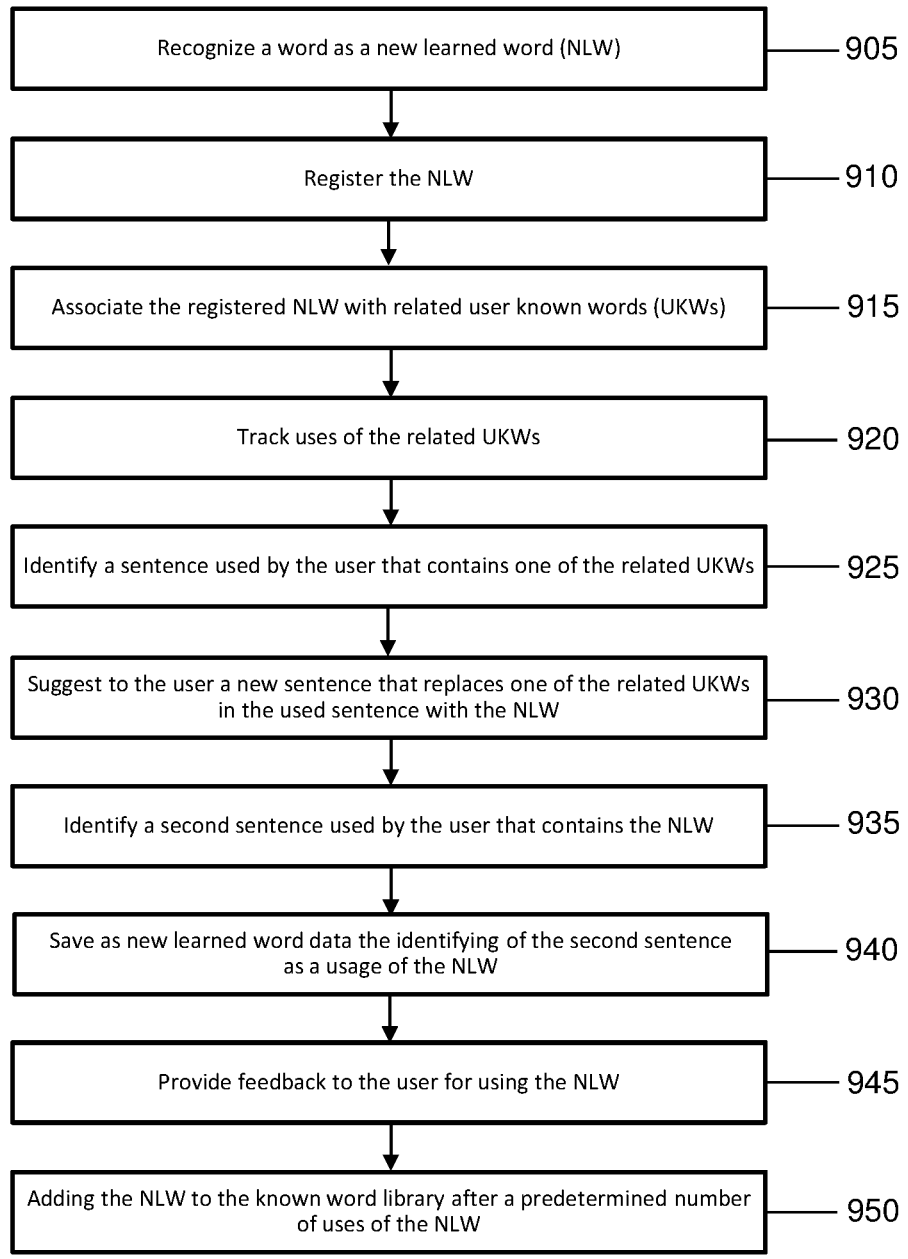
FIG. 9 shows a flowchart of an exemplary method in accordance with aspects of the invention.

FIG. 9 shows a flowchart of an exemplary method in accordance with aspects of the present invention. Steps of the method may be carried out in the environments of FIGS. 4, 5 and 8 and are described with reference to elements depicted in FIGS. 4, 5 and 8.

At step 905, the NLW recognizer 220 recognizes a word as an NLW for the user. At step 910, the NLW register 222 registers the NLW in the user's NLW list 224 as a registered NLW. At step 915, the NLW association wizard 230 associates the registered NLW with related known words in the UKW library 254. At step 920, the word usage tracker 240 tracks uses of the related UKWs by the user. At step 925, the UKW identifier 250 identifies a sentence used by the user that contains one of the related UKWs. At step 930, the NLW suggestion agent 252 suggests to the user a new sentence that replaces the UKWs in the used sentence with the NLW.

At step 935, the NLW identifier 260 identifies a second sentence used by the user that contains the NLW. At step 940, the RVMA GUI 210 saves as new NLW data 218 the identifying of the second sentence as a usage of the new learned word. At step 945, the feedback agent 270 communicates feedback (e.g. encouragement) to the user 301 for using the NLW. At step 950, the UKW identifier 250 adds the NLW to the UKW library 254 as a UKW after the user has used the NLW a predetermined number of times (for example, ten times).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

monitoring, by a computing device, text data of a computer-based communication of a user for a new learned word by comparing words in the computer-based communication of the user with words in a language in a stored known word list of the user;

recognizing, by the computer device, a word used by the user in the computer-based communication as a new learned word for the user in the language based on the monitoring;

registering, by the computer device, the new learned word as a registered new learned word in a new learned word database of the user, the new learned word database having a data structure that includes a memorization level of the new learned word by the user;

associating, by the computer device, the registered new learned word with one or more synonyms in the language in a known word library of the user, the known word library including words known to the user;

tracking, by the computer device, uses of the one or more synonyms by the user in text data from additional computer-based communications, wherein the tracking includes recording word use frequency in a table of use frequency of related known words of the user;

identifying, by the computer device, a sentence in a new computer-based communication of the user that contains one of the one or more synonyms; and sending, by the computer device, to the user, a suggested new sentence to replace the sentence in the new computer-based communication of the user in real-time based on the identifying, wherein the suggested new sentence includes the new learned word in place of the one of the one or more synonyms, wherein the recognizing the word used by the user in the computer-based communication as the new learned word for the user is further based on the computer device monitoring activity of the user related to the new learned word, and wherein the activity of the user comprises interactions of the user with Internet of Things (IoT) devices including interactions with a voice activated personal assistant configured to track spoken words of the user and a context in which each of the spoken words is used.

2. The computer-implemented method of claim 1, further comprising:

identifying, by the computer device, a second sentence of the user in another computer-based communication of the user that contains the new learned word; and saving, by the computer device, usage data regarding the new learned word based on the identifying the second sentence of the user in the other computer-based communication of the user, the usage data indicating a usage of the new learned word.

3. The computer-implemented method of claim 2, further comprising:

providing feedback, by the computer device, to the user for using the new learned word.

4. The computer-implemented method of claim 3, wherein the feedback comprises indicating to the user that the second sentence includes a desired usage of the new learned word.

5. The computer-implemented method of claim 2, further comprising:

monitoring, by the computing device, usage of the new learned word in computer-based communications of the user over a period of time;

adding, by the computer device, the new learned word to the known word library after the memorization level reaches a predetermined number based on the monitoring the usage of the new learned word, wherein the memorization level is a number of times the user correctly uses the new learned word in a sentence after the new learned word is the registered new learned word.

6. The computer-implemented method of claim 1, wherein the computer device includes software provided as a service in a cloud computing environment.

7. A computer program product, the computer program product comprising a computer readable storage medium having program instructions embodied therewith, the program instructions executable by a computing device to cause the computing device to:

monitor text or audio data of a computer-based communication of a user for a new learned word by comparing words in the computer-based communication of the user with words in a language in a stored known word list of the user;

recognize a word in the computer-based communication as the new learned word for the user in the language based on the monitoring;

register the new learned word as a registered new learned word in a new learned word database of the user, the new learned word database having a data structure that includes a memorization level of the new learned word by the user;

associate the registered new learned word with one or more synonyms in the language in a known word library of the user, the known word library including words known to the user;

track uses of the one or more synonyms by the user in text or audio data from additional computer-based communications, wherein the tracking includes recording word use frequency in a table of use frequency of related known words of the user;

identify a sentence in a new computer-based communication of the user that contains one of the one or more synonyms; and suggest to the user a suggested new sentence to replace the sentence in the new computer-based communication of the user in real-time based on the identifying, wherein the suggested new sentence includes the new learned word in place of the one of the one or more synonyms, wherein the recognizing the word in the computer-based communication as the new learned word of the user is further based on monitoring activity of the user with respect to Internet of Things (IoT) devices, the activity including user interactions with a voice activated personal assistant configured to track spoken words of the user and a context in which each of the spoken words is used.

8. The computer program product of claim 7, further comprising program instructions executable by the computing device to cause the computing device to:

identify a second sentence of the user in another computer-based communication of the user that contains the new learned word; and save usage data regarding the new learned word based on the identifying the second sentence of the user in the other computer-based communication of the user, the usage data indicating a usage of the new learned word.

9. The computer program product of claim 8, further comprising program instructions executable by the computing device to cause the computing device to:

provide feedback to the user for using the new learned word.

10. The computer program product of claim 9, wherein the feedback comprises indicating to the user that the second sentence includes a desired usage of the new learned word.

11. The computer program product of claim 8, further comprising program instructions executable by the computing device to cause the computing device to:

monitor usage of the new learned word in computer-based communications of the user over a period of time;

add the new learned word to the known word library after the memorization level reaches a predetermined number based on the monitoring the usage of the new learned word, wherein the memorization level is a number of times the user correctly uses the new learned word in a sentence after the new learned word is the registered new learned word.

12. A system comprising:

a processor, a computer readable memory, and a computer readable storage medium;

program instructions to monitor text data of a computer-based communication of a user for a new learned word by comparing words in the computer-based communication of the user with words in a language in a stored known word list of the user;

program instructions to recognize a word in the computer-based communication as a new learned word for the user in the language based on the monitoring;

program instructions to register the new learned word as a registered new learned word in a new learned word database of the user, the new learned word database having a data structure that includes a memorization level of the new learned word by the user;

program instructions to associate the registered new learned word with one or more synonyms in the language in a known word library of the user, the known word library including words known to the user;

program instructions to track uses of the one or more synonyms by the user in text data from additional computer-based communications, wherein the tracking includes recording word use frequency in a table of use frequency of related known words of the user;

program instructions to identify a sentence in a new computer-based communication of that contains one of the one or more synonyms; and program instructions to send to the user a suggested new sentence that to replace the sentence in the new computer-based communication of the user in real-time based on the identifying, wherein the suggested new sentence includes the new learned word in place of the one of the one or more synonyms, wherein the program instructions are stored on the computer readable storage medium for execution by the processor via the computer readable memory, and wherein the recognizing the word in the computer-based communication as the new learned word of the user is further based on monitoring activity of the user with respect to Internet of Things (IoT) devices, the activity including user interactions with a voice activated personal assistant configured to track spoken words of the user and a context in which each of the spoken words is used.

13. The system of claim 12, further comprising:

program instructions to set a vocabulary level for a pair of users in a computer-based conversation;

program instructions to adjust the one or more synonyms in the known word library of the user based on the vocabulary level set for the user;

program instructions to identify a second sentence in another computer-based communication of the user that contains the new learned word; and program instructions to save as new learned word data the identifying of the second sentence as a usage of the new learned word.

14. The system of claim 13, further comprising:

program instructions to provide feedback to the user for using the new learned word.

15. The system of claim 14, wherein the feedback comprises a discount on a product indicating to the user that the second sentence contains a desired usage of the new learned word.

16. The computer-implemented method of claim 5, wherein the data structure is defined as:

NewLearnedWord{UserID, NewWord, User's-frequency (times/day), memorization level (0~10), lastTimetoUse . . . (mm/dd/yyyy), listofUKWs (List<String>)}.

17. The computer-implemented method of claim 5, wherein the second sentence is a in an email communication, and the computer device performs the suggesting in real-time as a replacement for the second sentence.

* * * * *